UNITED STATES PATENT OFFICE.

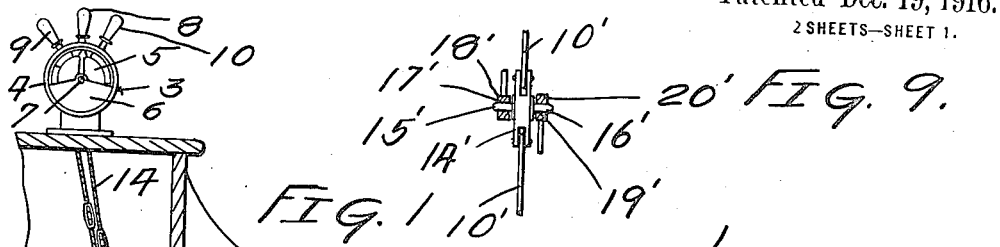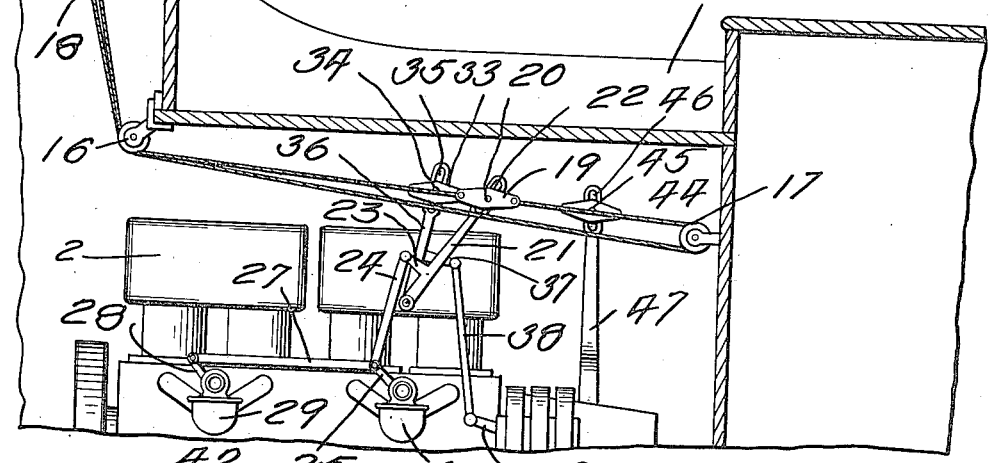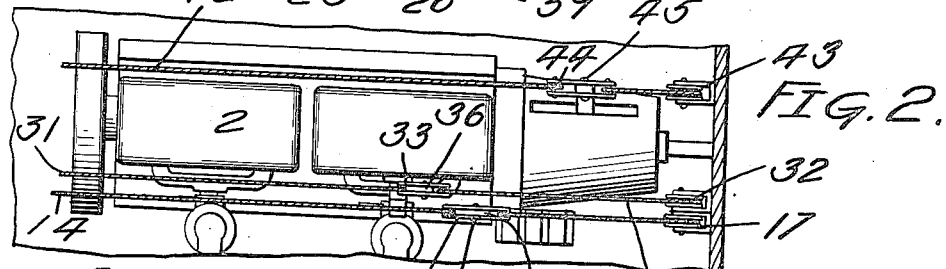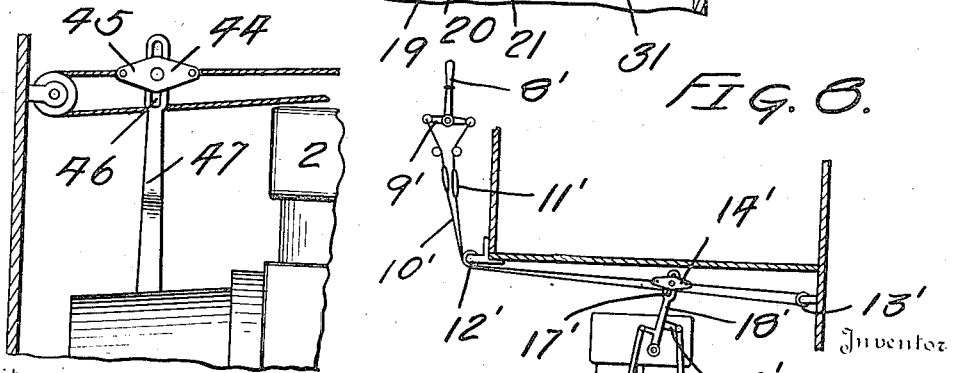

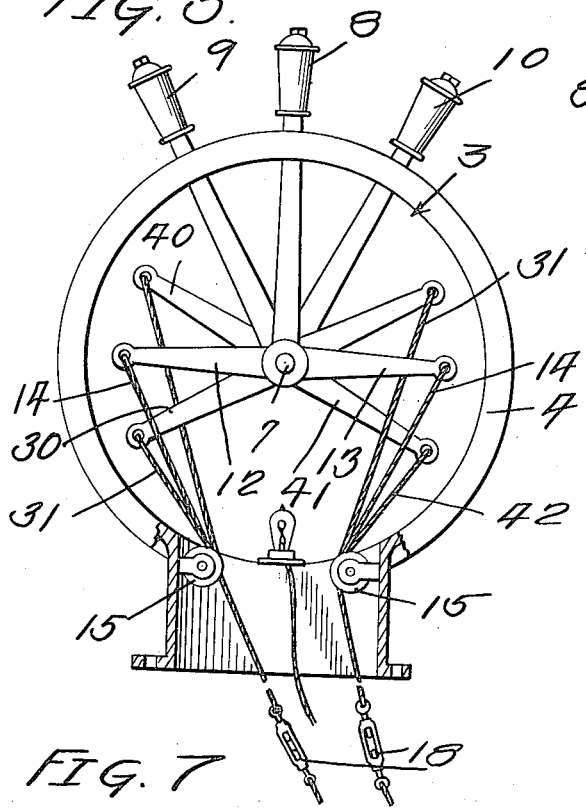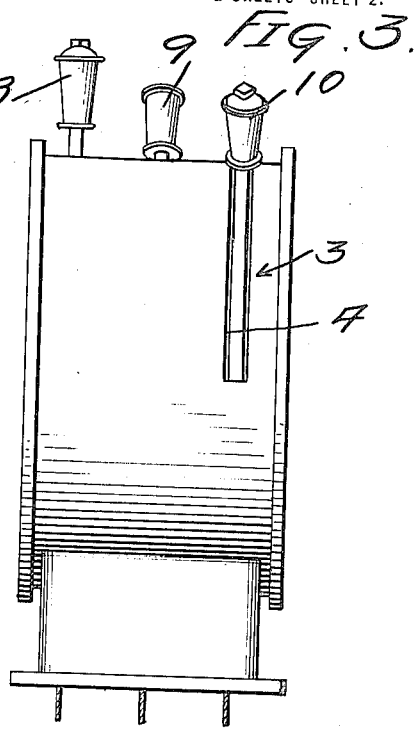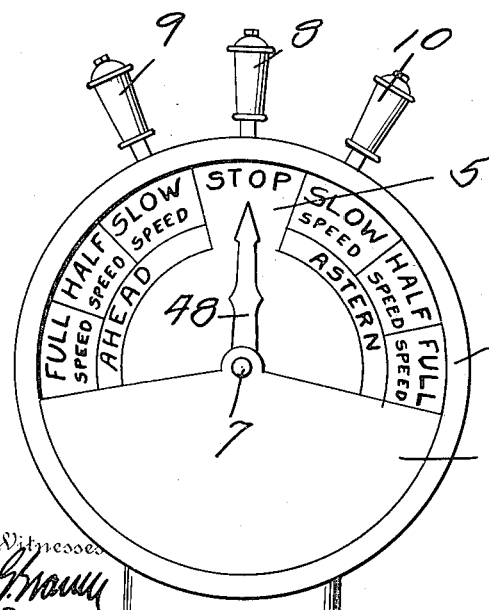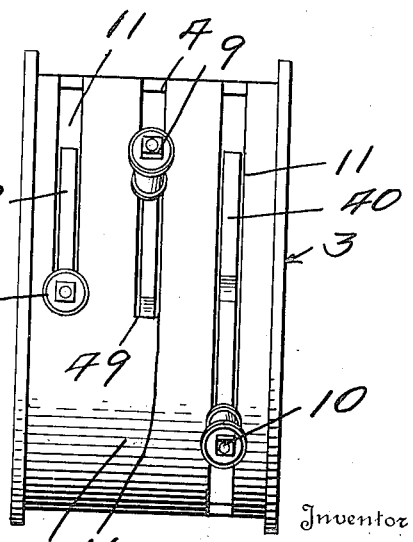

GEORGE H. RICHARDSON, OF DAYTON, NEW YORK.

MOTOR CONTROL FOR BOATS.

1,209,335.

Specification of Letters Patent.   Patented Dec. 19, 1916.

Application filed April 7, 1915.   Serial No. 19,734.

*To all whom it may concern:*

Be it known that I, GEORGE H. RICHARDSON, a citizen of the United States, residing at Dayton, in the county of Cattaraugus, State of New York, have invented certain new and useful Improvements in Motor Controls for Boats; and I do hereby declare the following to be a full, clear, and exact description of the invention, such as will enable others skilled in the art to which it appertains to make and use the same.

This invention relates to a motor control for boats.

An object of the invention resides in the provision of a device by means of which the spark, gasolene and the reverse gear may be controlled.

A further object of the invention resides in so constructing the device that the controlling handles will be inclosed in a suitable casing within reach of the operator and adjacent the steering wheel.

A further object of the invention resides in so constructing the device that the speed of the engine will be indicated.

With these and other objects in view, such as will appear as the description progresses, my invention comprises the combination and arrangement of parts as set forth in and falling within the scope of the appended claim.

Referring to the drawing: Figure 1 is an elevational view of my device showing the position it occupies on a boat, parts of the boat being shown. Fig. 2 is a fragmental plan view of the device. Fig. 3 is an edge view of the casing and controlling handles. Fig. 4 is an enlarged view, showing the reverse lever and the mechanism for operating the same. Fig. 5 is an elevational view of the casing in which the operating handles are located with the faces of the casing removed to disclose the handles within. Fig. 6 is an enlarged plan view of the same. Fig. 7 is an elevational view of the casing, showing the indicating dial. Fig. 8 is an elevational view of a modification of my device, parts being shown diagrammatically. Fig. 9 is a detail of the lever plate in the form shown in Fig. 8.

Referring to the drawing wherein like parts are indicated by like characters throughout the several views:—I have illustrated a portion of a boat which is indicated by the reference character 1 in which is an engine 2. My invention contemplates specifically the controlling of the gasolene and spark and also the reverse gear of this engine.

I have provided a casing 3 which is adapted to be mounted on a boat at a convenient point adjacent the steering wheel. This casing consists of a cylindrical portion 4 and side pieces 5 which are formed partially of glass and have lower metallic sections 6. Mounted in this casing 3 on a shaft 7 are a plurality of handles 8, 9 and 10 which extend upwardly through arcuate slots 11 in the cylindrical portion 4 of the casing.

The handle 8 will be designated as the gasolene control handle, the handle 9 as the spark control handle, and the handle 10 as the reverse handle. These handles are pivotally mounted on the shaft 7. The gasolene control handle 8 is provided with outwardly extending arms 12 and 13 to which are secured the ends of a cable 14, which cable passes about pulleys 15 in the casing 3, over a pulley 16 on the boat and thence around a pulley 17 which is secured to the bulk head. This cable 14 is provided with turn buckles 18 by means of which it may be kept taut.

Interposed in the cable 14 between the ends thereof is a plate 19 having a pin 20 thereon. It is obvious that as the control handle 8 is moved about the shaft 7 as a pivot that the plate 19 will be moved forwardly or rearwardly. In order that the movement of this plate may control the gasolene I have pivoted a lever 21 to the casing of the engine and have provided the upper end of the same with a slot 22 through which the pin 20 in the plate 19 extends. This lever 21 is provided with an arm 23 to which is pivoted a link 24. This link 24 is pivoted to the controlling arm 25 of the carbureter 26. Extending from this arm 25 is a link 27 pivoted to the arm 28 of the carbureter 29 which is likewise secured to the motor casing. Thus when the gasolene control handle 8 is moved the arms 25 and 28 of the carbureters 26 and 29 will be moved to regulate the flow of gasolene into the same.

Now in order that the spark may be controlled I have provided the spark control handle 9 with outwardly extending arms 30 to which are secured the ends of a cable 31, which cable passes about pulleys within the casing 3, is provided with turn buckles and passes about a pulley similar to the pulley 16 and an additional pulley 32 similar to the pulley 17 and located beside the same. This cable is likewise provided with a plate 33 having a pin 34 thereon, which pin extends through a slot 35 in a lever 36, the latter being pivoted to the casing of the engine and having an outwardly extending arm 37. To this arm is secured a link 38 which is in turn secured to the timer arm 39. Upon movement of the spark control handle 9 the lever 36 will be operated and through the connecting mechanism will change the timing of the spark.

In order that the reverse gears may be controlled, I have provided the reverse control handle 10 with outwardly extending arms 40 and 41 to which is secured a cable 42 provided with turn buckles and passes about pulleys in the casing 3, similar to the pulleys 15 and a pulley 43 on the bulkhead. This cable 42 is provided with a plate 44 having a pin 45 thereon which passes through a slot 46 in the reverse lever 47. Thus when the reverse control handle 10 is actuated the reverse lever 47 will be actuated.

Now in order that the operator may be informed as to the position of the reverse lever and the speed of the motor I have frosted the glass portion of the side pieces 5 of the casing 3 and divided the same into compartments as shown in the drawings in which is printed the different speed either ahead or astern and also the word "Stop" and I have provided the casing 3 with an electric light within the same so that the sides of the casing will be illuminated and the words printed thereon visible. I have secured to the gasolene control handle an indicator 48 located within the casing 3 which is prevented from movement to the astern positions by the contact of the handle 8 with the edge 49. Now as the gasolene control handle 8 is moved so as to open the carbureter partially the indicator 48 moves to the compartment indicating low speed ahead, and as the speed is stepped up by the further opening of the carbureter the indicator moves to indicate higher speed ahead. Now when the spark handle is moved this will also be moved to the side of the casing marked Ahead and the frequency of the spark gradually increased by such movement. The reverse control handle may, however, be moved to either ahead or astern position and when moved to the astern position will cause the reversal of the direction of motion of the propellor shaft. When the handles are in the positions marked "Stopped" the gasolene will be cut off and the engine stopped. If the reverse control handle 10 is in the position stop the engine may run free as the gears will be in neutral.

It is of course to be understood that the device may be mounted upon a boat in any convenient manner, the manner of mounting depending largely upon the construction of the boat.

Assuming that the parts are mounted as shown in the drawing and that the controlling handles 8, 9 and 10 are in the stop position. If it is desired to start the engine the spark control handle 9 will be advanced to the desired position on the ahead side of the casing 3 and the gasolene control handle 8 will be advanced to the slow speed ahead. Now after the engine is started the reverse control handle 10 may be either moved forwardly to the ahead position or rearwardly to the reverse position at which time the boat will be propelled in the proper direction. The movement of these control handles will, through the aforedescribed mechanism, allow gasolene to enter the carbureter to advance the spark and shift the reverse gears.

Now in the embodiment of my invention shown in Fig. 8 instead of providing three control handles, I have provided a handle 8' which is provided with arms 9' to which arms are connected the ends of a cable 10'. This cable is provided with turn buckles 11', passes over a pulley 12' on the boat and around a pulley 13' on the bulk head. This cable is provided with a plate 14' which has pins 15' and 16' thereon. The pin 15' on the plate 14' extends through a slot 17' in the lever 18' which is operatively connected to the carbureter in a manner similar to that in which the lever 21 is connected in the form shown in Figs. 1 to 7 inclusive. The pin 16' on the plate 14' extends through a slot 19' on the spark control lever 20', which lever is connected to the timing arm. Thus when the handle 8' is operated the carbureter and spark will be simultaneously adjusted and consequently the proper relation between the two will be constantly maintained irrespective of the speed of the engine.

From the foregoing description it will be seen that I have provided an exceedingly simple and compact motor control for boats so that the controlling handles will be within convenient reach of the operator and the carbureter and the spark controlled. I have further made provision in the device for the controlling of the lever gears.

I have mounted the controlling handles within a casing which is of such construction that the speed of the motor and the fact as to whether the boat is running ahead or astern will be indicated to the operator.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claim.

What I claim is:—

The combination with a lever pivoted at one end and having a longitudinally extending slot in the other end, of a fixed pulley on one side of the lever, a controlling lever having a pair of arms extending outwardly in opposite directions from its pivot point, a cable having its ends secured to said arms and passing around said pulley, a plate interpolated in said cable and having a pin thereon extending into and slidable in the slot in the first mentioned lever and means coöperating with the controlling lever for indicating the position of the first mentioned lever.

In testimony whereof, I affix my signature, in the presence of two witnesses.

GEORGE H. RICHARDSON.

Witnesses:
  D. N. THRASHER,
  LEAH GRACE THRASHER.